March 6, 1962  R. J. BOWES, JR., ET AL  3,024,184
ELECTROPHORETIC ARTICLE COATING MACHINE
Filed Sept. 29, 1958  4 Sheets-Sheet 3

INVENTORS
ROBERT J. BOWES JR.
DONALD R. PEACOCK
BY
Robert E. Strausser
ATTORNEY

United States Patent Office 3,024,184
Patented Mar. 6, 1962

3,024,184
ELECTROPHORETIC ARTICLE
COATING MACHINE
Robert J. Bowes, Jr., and Donald R. Peacock, Seneca Falls, N.Y., assignors, by mesne assignments, to Sylvania Electric Products Inc., Wilmington, Del., a corporation of Delaware
Filed Sept. 29, 1958, Ser. No. 763,902
3 Claims. (Cl. 204—300)

This invention generally relates to a process and apparatus for electrophoretically coating articles and more particularly to the electrophoretic coating of articles which will be subsequently employed in the manufacture of electron discharge devices such as radio receiving tubes and the like. The articles to be coated may be formed of filamentary material which when coated with emitting substances functions as a source of electrons or when coated with an insulating substance such as a powdered refractory oxide may be used as a heater for an indirectly heated cathode.

Prior to this invention, formed heater coils fabricated from materials such as tungsten wire were electrophoretically coated with emissive or insulating materials by hand in a single immersion process. This technique resulted in variations of the coating characteristics between heaters. The coating characteristics such as thickness, density and area covered are related to the depth and time of immersion in the coating solution. These factors are extremely difficult to control with preciseness when hand operations are used. The coating formed by single immeration process tended to crack during the processing and subsequent operation of devices employing heaters fabricated by this method. The materials used in the coating process are a graduated dispersion of the substance to be coated suspended in a binder such as a powdered refractory oxide in a mixture of nitrocellulose lacquer and amyl acetate. Other coating suspensions which have been utilized are described in the U.S. Patent Numbers 2,442,863 and 2,442,864 issued to E. J. Schneider and assigned to the same assignee as the present application.

The depth of immersion of the coil to be treated in the electrophoretic bath is important since it determines the length of heater wire remaining uncoated after the coating operation. This uncoated length is of particular significance since the completed heater coil is attached thereby to the supporting structures in the finished tube. If the depth of immersion is too great there will remain an insufficient length of wire without coating, making attachment to the supporting structure difficult if not impossible. Conversely, if the heater coil is not immersed to a sufficient depth, localized over-heating occurs in the bare portion when the heater is employed in an electron discharge device.

Thus it is an object of this invention to uniformly electrophoretically coat articles with an insulating or emissive coating having certain desired characteristics.

Another object of the invention is to produce coated heater coils having a high degree of uniformity with exceptionally small variations in characteristics from heater to heater.

Briefly, one aspect of the invention comprises a process and apparatus for carrying out the process which utilizes the steps of grasping the article to be coated, immersing the article to be coated in a first electrophoretic bath, applying a potential between the article and an electrode in the bath to coat the article, removing the article from the bath and immersing the article in a second electrophoretic bath, applying the potential between the article to be coated and an electrode in the bath to coat the article with a second coat, removing the coated article from the second bath, processing the article to remove any excess coating material, and drying the coating on the article.

It has been found that heater coils which have been coated by this method have a lower density coating near the exterior surface than heater coils processed by prior art methods. This reduced density prevents cracks, which are normally brought about by the expansion and contraction of the coating and the tungsten coil during processing and the subsequent operation in a completed tube.

For a better understanding of the invention, reference is made to the following description taken in conjunction with the accompanying drawings in which.

One embodiment of the invention comprises the combination of article carrier means, a plurality of workstations whereat articles are treated, means for progressively indexing the article carrier means between the workstations, and means for vertically reciprocating the indexing means and article carrier means between the indexing movements.

Figure 1:
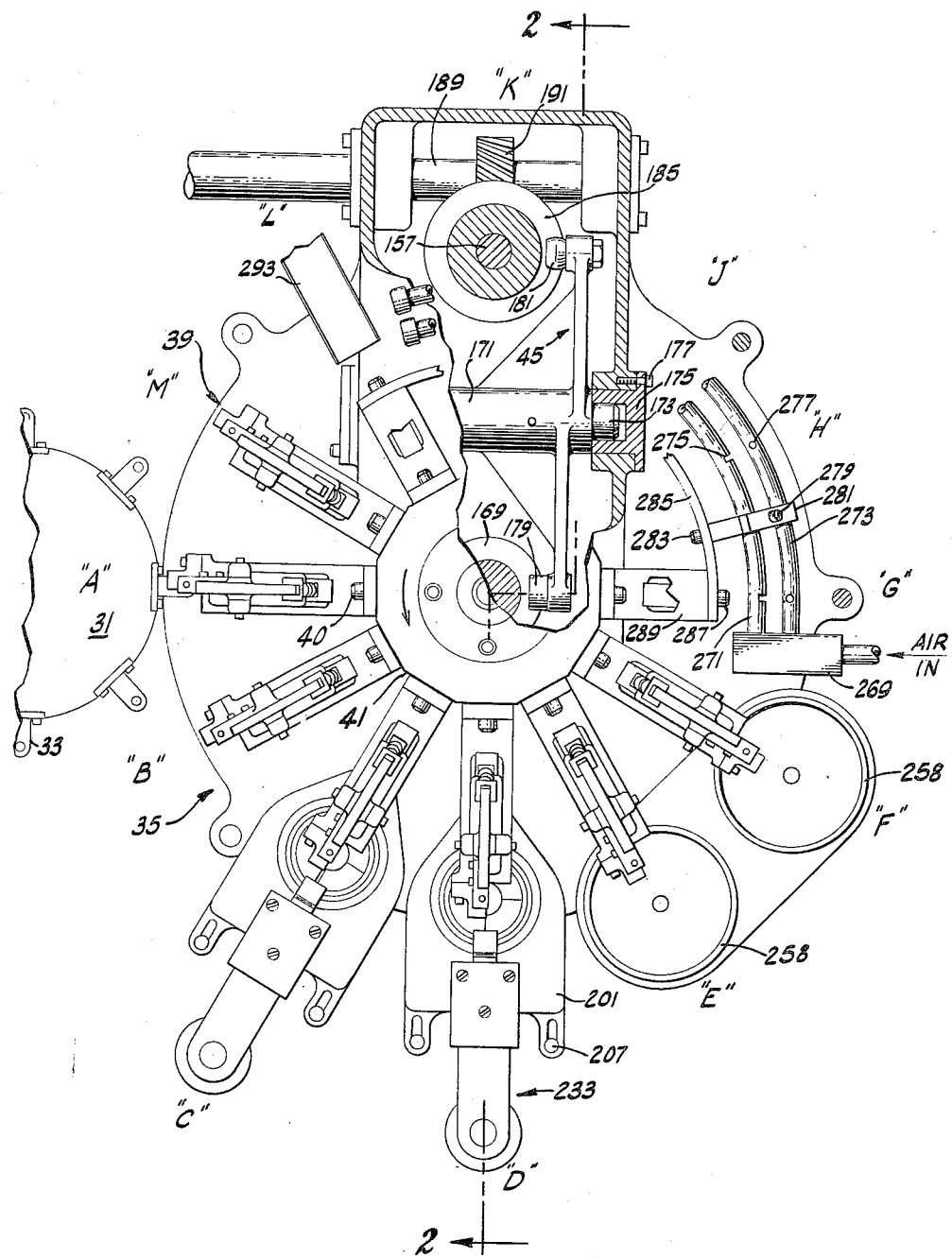
FIG. 1 is a plan view of one embodiment of the invention showing in particular the disposition of the workstations about the periphery of the indexing turret and a partial section showing the turret elevating mechanism, with the common supporting platform removed for purposes of clarity.

Referring to FIG. 1, bare wire heater coils which are wound on a coil winding machine (not shown) are deposited in the intermediate transfer turret 31 which is provided with a plurality of coil receiving pockets 33. The transfer turret is synchronized with the operation of the coil coating machine 35 and the coil winding machine by a system of cams and linkages (not shown). The coil 37 which has been wound in the coil winder is deposited in a coil receiving pocket 33 in the transfer turret and is subsequently positioned beneath the article carrier means 39. The article carrier means, which is adjustably mounted by bolts 40 on the turret 41, is indexed between workstations by the indexing means 43, FIG. 2. At each of the workstations A, B, C, D, E, F, G, H, J, K, L, and M the article carrier means and turret are vertically reciprocated to raise and lower the article being treated. This movement is caused by the reciprocating means 45.

Figure 5:
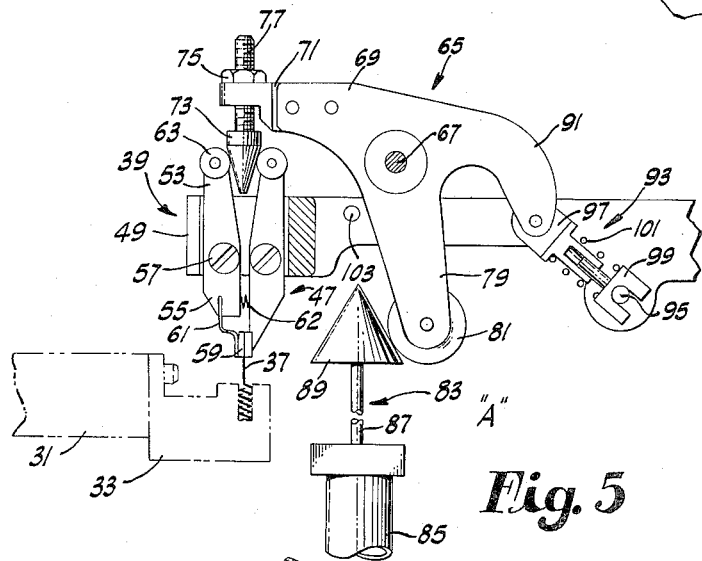
FIG. 5 is a side elevation view of one embodiment of the article carrier means shown in the closed or article carrier means shown in the closed or article grasping position.
Figure 6:
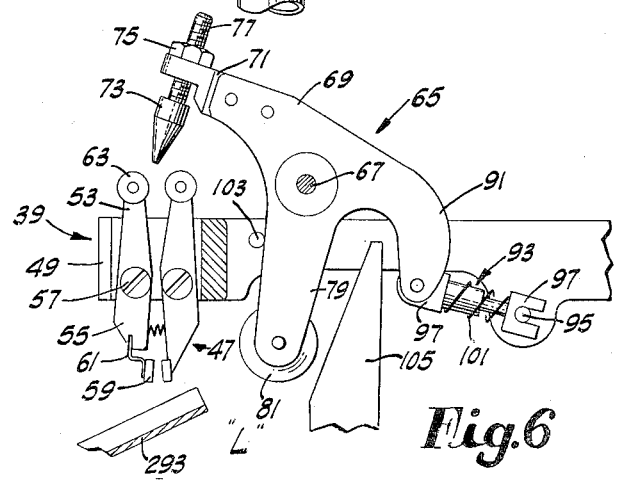
FIG. 6 is a view similar to FIG. 5 showing the jaws of the article carrier means in the open or article releasing position.
Figure 10:
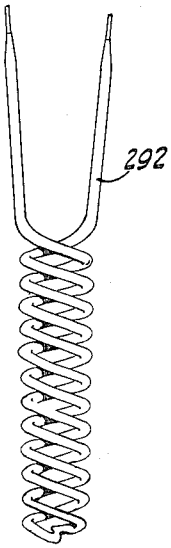
FIG. 10 is a plan view of a coated heater coil of a type which may be produced in accordance with one aspect of the invention.
Figure 7:
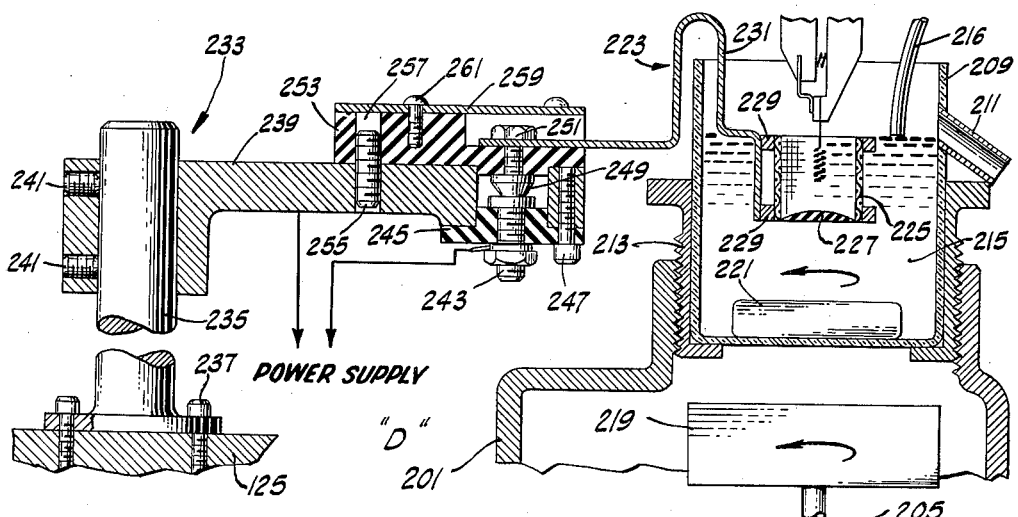
FIG. 7 is a sectional side elevation view of workstation C shown in FIG. 1.

Referring to FIGS. 5 and 6, the article carrier means 39 comprises a pair of jaw members 47 which are pivoted for relative movement between a closed or article grasping position and an open or releasing position. The jaw members are mounted on a frame member 49 which is affixed to the turret 41 by bolts 40. Each jaw member 47 has an upper end 53 and a lower end 55 with the pivot point 57 therebetween. A jaw block 59 of a hard material such as tungsten carbide is affixed to the lower end of each jaw member either directly or through resilient conductive means such as a phosphor bronze spring arm 61 so that although the jaws clamp together tightly, the article grasped between them will not be crushed. A spring 62 is provided between the jaw members intermediate the pivot point 57 and the lower end 55 to bias the jaw members to an open position. A roller member 63, whose function will be later explained, is provided at the upper end 53 of each jaw member.

A spider member 65 having three arms is pivotally mounted on a shaft 67 affixed to the frame 49. The first arm 69 carries bracket 71 upon which is mounted a conical cam member 73 whose position may be adjusted by a nut 75 operating on the threaded portion 77. On the second arm 79 a roller 81 is mounted for cooperation with the vairous jaw operating means. The jaw closing means 83 comprises a fluid pressure motor 85 whose ram 87 supports a conical operator 89 for cooperation with the roller 81. Mounted on the third arm 91 of the spider is a restraining means 93 which cooperates with the third arm and a pin 95 on the frame 49 to form a toggle mechanism. The restraining means comprises a first or sleeve member 97 pivotally mounted on the third arm 91 and a second or inner member 99 pivotally mounted on the frame. A spring 101 is provided between the two members to urge them apart. A stop pin 103 is provided on the frame 49 to limit the travel of the spider in the jaw open position by contact with the arm 79 of the spider. The travel of the spider toward the article grasping position is limited by the closed position of the jaws which prevents further movement of the conical cam 73 mounted on the spider. A surface cam 105 which is mounted at the unload position L (shown in FIG. 6) is provided to shift the spider 65 to the jaw open position upon the descent of the article carrier as will be explained later.

Figure 2:
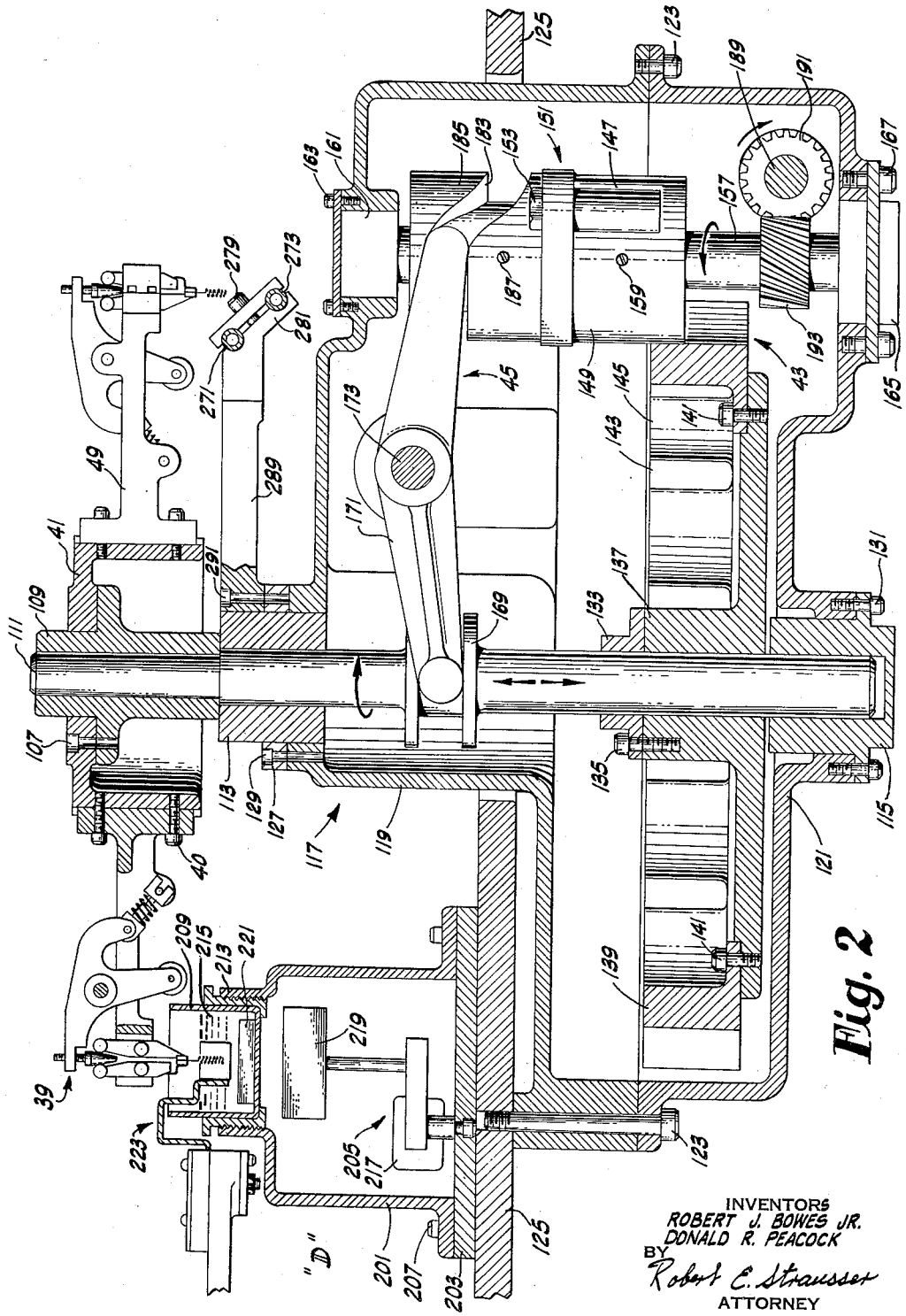
FIG. 2 is a side elevation in section of the embodiment shown in FIG. 1 taken along a line 2—2 thereof showing the turret indexing and elevating mechanism.

The turret or indexible carrier 41 is mounted by bolts 107 on a collar 109 which is affixed to the main shaft 111, FIG. 2. The main shaft 111 is supported by upper bearings 113 and lower bearings 115 in the apparatus frame 117. The frame is formed from two complementary parts 119, 121 fastened together by bolts 123, some of which also serve to attach the frame to the platform 125. The upper bearing 113 is retained in the upper half of the apparatus frame 119 by a collar member 127 and bolts 129. The lower bearing 115 is affixed to the lower half of the apparatus frame 121 by bolts 131.

Figure 3:
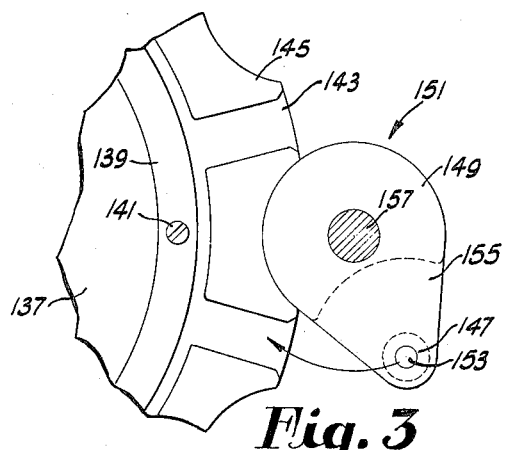
FIG. 3 is a plan view of a portion of the indexing mechanism shown in the turret locked position.
Figure 4:
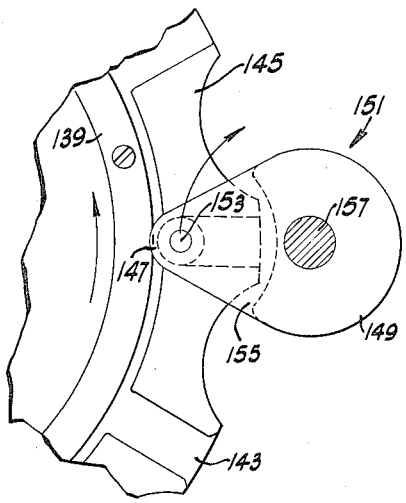
FIG. 4 is another view of the indexing mechanism of FIG. 3 indicating the movement of the respective parts during the indexing operation.

Referring to FIG. 2, affixed to the main shaft 111 by a collar 133 and bolts 135 is a Geneva wheel support member 137. The follower portion of the Geneva wheel is in the form of a ring 139 fastened by bolts 141 to the support member 137. The periphery of the ring 139 (see FIGS. 3 and 4) has slots 143 and cylindrical portions 145 which cooperate with the driving pin 147 and cylindrical body 149 of the Geneva wheel operator 151 to rotate and lock the Geneva wheel. The Geneva operator 151 driving pin 147 is in the form of a cylindrical roller which is rotatably attached by a nut 153 to the operator. The operator 151 also has a cut-away portion 155 to provide clearance between the operator and the Geneva wheel when there is relative movement between them. The operator 151 is adjustably attached to the Geneva operator shaft 157 by a set screw 159. Support for the operator shaft is provided at its upper end by a bearing 161 fastened by bolts 163 to the frame 117 and at its lower end by a bearing 165 also fastened by bolts 167 to the frame.

The reciprocating means 45 comprises in part a collar 169 which is affixed to the main shaft, and a bell crank 171 pivoted on a shaft 173 which is carried by bearing members 175 fastened by bolts 177 to the frame 117 (see FIG. 1). The bell crank 171 has a follower 179 on one arm cooperating with the collar 169 and a second follower 181 on its other arm cooperating with the groove 183 of a barrel cam 185 which is adjustably mounted by a set screw 187 on the Geneva wheel operator shaft 157. The rotation of the barrel cam 185 causes the vertical reciprocation of the main shaft 111 through action of the bell crank 171 on the collar 169.

The drive for the indexing means 43 and the vertical reciprocating means 45 of the coil coating machine is derived from a central drive system (not shown) which powers the associated coil winder (not shown) and the transfer turret 31. The drive power is transmitted through a drive shaft 189, a gear 191 mounted on the drive shaft within the frame 117 and a second gear 193 affixed to the Geneva operator shaft 157.

Referring to FIGURES 1, 2, 7 and 8, the workstations C and D, which are the electrophoretic coating positions, will be described next. Since they are duplicates of one another the description of station D will also serve for station C. A housing 201, having a bottom plate 203 and containing a magnetic stirrer drive 205 is adjustably mounted on the platform 125 by bolts 207. The platform is shown in part in FIG. 2 but has been omitted from FIG. 1 for clarity. A cup 209 formed from non-magnetic material such as glass or stainless steel having an over flow spout 211 is carried by an adjustable bushing 213 in the upper portion of the housing 201. The position of the cup may be adjusted so that the desired height of the surface of the electrophoretic coating suspension 215 with respect to the immersed heater coils may be maintained. Additional coating suspension may be added through the lead-in tube 216 from a source not shown. The magnetic stirrer drive 205 consists of a motor 217 which rotates a magnetic bar member 219. A following magnetic stirrer 221 is positioned in the bottom of the cup 209 where it is rotated by the inter-action of the magnetic fields to provide stirring of the coating suspension.

One embodiment of the coating electrode 223 (see FIG. 7) comprises a cylindrical conductive mesh structure 225 fabricated from stainless steel and having a bottom member 227 of an insulating material which is not affected by the coating suspension 215. The mesh structure 225 is supported by two conductive rings 229 which also serve to attach the mesh to the stainless steel electrode lead-in strap 231. The strap positions the mesh in the coating bath as well as serving as an electrical connector.

A mount structure 233 is provided for supporting the coating electrode 223 in adjustable relationship with the coating cup 209. The mount structure has a vertical standard 235 which is provided with a flanged end through which mounting bolts 237 pass to secure the standard to the platform 125. A bracket member 239 is adjustably attached at one end to the vertical standard 235 by set screws 241 so that the position of the assembly may be changed. The electrode socket member 243 is mounted on an insulator 245 which is held by a screw 247 within an opening 249 in the free end of the bracket 239. A corresponding plug member 251 is mounted on an insulator 253 and connected to the electrode 223. A locating dowel pin 255 is provided on the bracket which matches with an opening 257 in the insulator 253 to retain the plug-in structure in place. A cover plate 259 for the plug-in member 251 is retained in position by screws 261 in the insulator 253.

Figure 8:
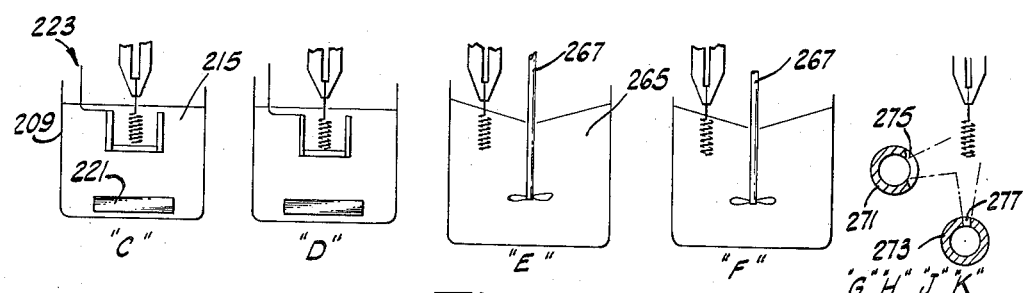
FIG. 8 is a diagrammatic view showing the relative position of the article being coated with respect to the various baths and drying positions.
Figure 9:
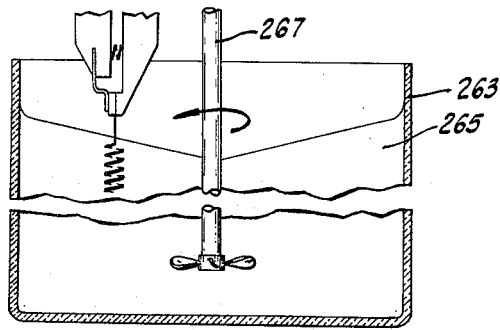
FIG. 9 is a detail drawing of workstation E of FIG. 1.

Referring to FIGURES 1, 8 and 9, the workstations E and F, which are the coating rinse stations, will be described next. At each of these positions a beaker 263 is provided containing the proper rinsing solvent 265. The rinse at workstation E is a mixture of petroleum ether and amyl acetate. The rinse at F is petroleum ether alone. An agitator 257 which may be driven by an electric or air motor (not shown) is centrally positioned in each beaker to assure full agitation of the rinse. The beakers are restrained from movement by a ring 258 on the platform 125.

Referring to FIGURES 1, 2 and 8, forced air drying for the rinsed coated article is provided at workstations G, H, J and K where air which has been cleaned and dried (by means not shown) is supplied under pressure to a manifold 269. From this manifold it is distributed to the workstations by an upper conduit 271 and a lower conduit 273. The upper conduit 271 is positioned at the side of the heater position at the lowest point of the descent of the coated heater. The conduit has a slot 275 in its side wall at each of the workstations so that a fan shaped air flow pattern is established about the coated heater (see FIGURE 8). The lower conduit 273 which is positioned beneath the path of the heater coils has a hole 277 in its upper surface at each of the workstations so that the air flow is parallel to the longitudinal axis of the heater coil. The air patterns selected have been found to assist in the prevention of the formation of a drop or slug of coating material at the bottom of the coated heater coil. The conduits 271, 273 are held in position by a bolt 279 and clamp 281 arrangement which is in turn held by bolts 283 to a curved support 285. The support is held by bolts 287 on arms 289 which are bolted 291 to the main apparatus frame 117.

At the position L a chute is provided to receive the dry coated heater coil 37 upon the opening of the article carrier means 39 by the cam 105 which is positioned therebeneath when the article carrier means descend.

The embodiment of the invention described operates in the following manner. A heater coil fabricated from uncoated tungsten wire is placed in the pocket 33 of the trasfer turret 31 by the coil wiring machine (not shown). Subsequently the transfer turret is indexed so that the coil containing pocket 33 is positioned beneath the article carrier means 39 on the coil coating machine 35. The heater coil is so positioned in the pocket that, upon the descent of the article carrier means due to the operation of the reciprocating means 45, one leg of the coil will be positioned between the jaw blocks 59 of the jaw members 47 when operated by the jaw closing means 83. Only one leg of the heater is grasped by the jaws so that the coil is not distorted during the subsequent coating operations. The jaw closing means 83 are operated as the conical cam 89 contacts roller 81 on the arm 79 of the spider 65. Movement of the cam causes the spider to rotate in a counterclockwise direction about its pivot 67. This movement causes the restraining means 93 connected to the second arm of the spider 91 to move above center so that when the operator withdraws the spider will remain in this position. This movement of the spider causes the conical cam 73 mounted on the spider arm 69 to force the rollers 63 of the jaw members 47 apart, overcoming the bias of spring 62 which is between them. The leg of the heater coil is therefore clamped between the jaw blocks 59 by the force of the spring 101 of the restraining means acting through the spider 65 and the conical cam 73.

The pickup of the heater coil which is to be coated is performed during the time when the entire turret 41 and all of the associated article carrier means 39 are at their lowest position relative to the platform 125. The turret during this period has been locked against rotation by the cooperation of the Geneva wheel operator 151 and the Geneva wheel 139. Rotation of the drive shaft 189 causes the rotation of the Geneva operator shaft 157 through the associated gear train 181, 193. The rotation of the Geneva operator shaft is translated into a reciprocatory motion of the turret through the cooperation of the barrel cam 185, bell crank 171 and the collar 169 on the cam shaft 111. As the barrel cam rotates the follower 181 of the bell crank 171 follows the configuration of teh groove 183. The barrel cam and Geneva operator are so arranged on their common shaft so that the indexing movement occurs only when the turret is in its uppermost position so that the article carrier means are clear of the workstations.

Since there are a plurality of article carrier means associated with the described embodiment of the invention, we will follow only one through the sequence of operations. It is to be understood that the operations are all occurring simultaneously at the various workstations to the other heater coils which are in process.

The turret indexes to bring the article carrier means to workstation B which is unoccupied. A subsequent indexing cycle brings the article carrier means to workstation C which is the first of the two electrophoretic coating stations. The article carrier means descends so that the heater coil is immersed to the proper depth in the coating suspension 215, which due to the arrangement of the apparatus will be the same for all heater coils at all stations. This results in an extremely accurate control of the length of heater leg left uncoated. The coating suspension is contained in the cup 209. The coating electrode structure 223 is so positioned that the metallic mesh member 225 is just beneath the surface of the coating suspension and surrounds the coil at its greatest depth of immersion. Although the stirrer 221 is rotated with sufficient speed to cause turbulence of the coating suspension, the solid insulating disc 227 in the bottom of the electrode causes a calm area to appear at the surface thus allowing fine control of the line at which the coating will appear on the coil. While the heater coil is fully immersed a timing cam (not shown) actuates the energizing control of the power supply placing a high voltage between the stainless steel mesh 225 and the coil to be coated. The connection to the coil is made through the machine frame 117 and the article carrier means 39. The voltage applied may be in the range of 1000 to 1500 volts for a period of ½ to 2 seconds for each coating operation. The coating suspension utilized may be of the type described in the U.S. Patent 2,442,864, issued to E. J. Schneider and assigned to the same assignee as the present application. After the desired coating time has elapsed, the timing cam de-energizes the power supply and the turret is then raised and indexed to the next position. This is a duplicate of the preceding station and the coating operation is repeated in a similar fashion, thus applying a second coat to the heater coil. The turert indexes once again to bring the coated heater coil to workstation E which is the first rinse position. At this station the coated heater coil is immersed in the rinse bath by the reciprocation of the turret and the excess material which loosely adhered to the coil is removed by the action of the agitated solvent bath. The solvent utilized at workstation E is a mixture of petroleum ether and amyl acetate. Subsequent reciprocation and indexing of the turret brings the coated heater coil to workstation F at which the second rinse occurs. The solvent in this bath is petroleum ether only. A further reciprocation and indexing cycle brings the coated heater coil to station G which is the first of four air drying stations. A flow of air which has been cleaned and dried is forced over the coated heater coil from slot 275 and holes 277 in the upper 271 and lower 273 conduits. The multiple drying stations and selected air patterns prevent the formation of a drop or slug of coating material at the bottom of the coil. At workstation L, which is reached by a subsequent series of indexing reciprocatory motions, descent of the article carrier means on the turret causes the roller 81 on the arm 79 of the spider 65 to encounter a fixed cam 105 (see FIG. 6). Continued descent of the article carrier means causes the clockwise rotation of the spider. This causes the restraining means 93 to move under center at the same time removing the conical cam 73 from between the rollers 63 of the jaw members 47. This allows the spring 62 to bias the jaw members 47 to the open or article releasing position thus releasing the dried coated heater coil 292 onto the chute 293 down which it slides to a receptor (not shown). The restraining means keeps the cam 73 from contacting the rollers 63 of the jaw members 47 thus allowing the jaws to remain open until closed by the generating means 83 at the load position A. When a sufficient number of coated coils have been collected they are fired in an inert atmosphere furnace at 1670° C. for seven minutes to process and fix the coating to the wire.

Due to the construction of the particular embodiment heretofore described, ten heater coils may be in various stages of preparation at the same time. The number of workstations and article carrying means may be increased or decreased without departing from the scope of the invention. Also, other means may be utilized for the production of the indexing and reciprocating motions used, without departing from the generality of what has been described.

What is claimed is:

1. In an electrophoretic article coating machine the combination of article carrier means comprising a turret and a plurality of article grasping means, said grasping means being radially mounted on the periphery of said turret and each having a pair of jaw members pivoted for relative movement between a closed article grasping position and an open releasing position each having an upper and a lower end with a pivot point therebetween, a jaw block affixed to said lower end for contacting the article, a spring normally biasing said jaw members apart, a roller mounted at the upper end of said jaw member, a spider member mounted on said turret adjacent said grasping means having three arms, a conical cam mounted on a first spider arm for cooperation with the rollers on the ends of the jaw members for moving said jaw members to a closed position, a roller on the second spider arm, first operating means for contacting said roller to cause said conical cam to move the jaws to a closed position, second operating means cooperating with said roller to remove the cam allowing the jaws to be opened by said spring, and restraining means connected to the third arm of said spider to restrain the movement thereof, a plurality of workstations whereat articles are treated, means for progressively indexing the article carrier means between workstations and means to vertically reciprocate the indexing means and article carrier means between indexing movements.

2. In an electrophoretic article coating machine the combination of article carrier means comprising a turret, a plurality of article grasping means peripherally mounted on said turret, each of said grasping means comprising a frame, a pair of jaw members each having an upper end and a lower end with a pivot point therebetween, said jaw members being pivotally mounted on said frame and movable between a closed article grasping position and an open article releasing position, each of said jaw members having an article contacting block affixed to the lower end thereof and a roller mounted at the upper end thereof, a spring reacting between said jaw members whereby they are normally biased to the releasing position, a spider member pivotally mounted on said frame and provided with three arms, an adjustable cam mounted on a first arm of said spider for contacting said jaw rollers and for moving said jaw members to said grasping position when said spider is operated, a cam roller mounted on a second arm of said spider, restraining means extending between a third arm of said spider and said frame and forming a toggle mechanism therewith, means for contacting said cam roller and pivoting said spider whereby said toggle mechanism is operated between a clamping position and a releasing position, a plurality of workstations whereat articles are treated, means for progressively indexing said article carrier means between workstations and means to vertically reciprocate the indexing means and article carrier means between indexing movements.

3. In an electrophoretic article coating machine the combination of article carrier means comprising a turret, a plurality of article grasping means peripherally mounted on said turret, each of said grasping means comprising a frame, a pair of jaw members each having an upper end and a lower end with a pivot point therebetween, said jaw members being pivotally mounted on said frame and movable between a closed article grasping position and an open article releasing position, one of said jaw members having an article contacting block fixedly mounted to the lower end thereof and a roller mounted at the upper end thereof, the other jaw member having an article contacting block resiliently mounted at the lower end thereof and a roller mounted at the upper end thereof, a spring reacting between said jaw members whereby they are normally biased to the releasing position, a spider member pivotally mounted on said frame and provided with three arms, an adjustable cam mounted on a first arm of said spider for contacting said jaw rollers and for moving said jaw members to said grasping position when said spider is operated, a cam roller mounted on a second arm of said spider, restraining means extending between a third arm of said spider and said frame and forming a toggle mechanism therewith, means for contacting said cam roller and pivoting said spider whereby said toggle mechanism is operated between a clamping position and a releasing position, a plurality of workstations whereat articles are treated, means for progressively indexing said article carrier means between workstations and means to vertically reciprocate the indexing means and article carrier means between indexing movements.

References Cited in the file of this patent

UNITED STATES PATENTS

| | | |
|---|---|---|
| 557,453 | Thompson | Mar. 31, 1896 |
| 747,833 | Alger et al. | Dec. 22, 1903 |
| 2,236,861 | Widell | Apr. 1, 1941 |
| 2,478,322 | Robinson et al. | Aug. 9, 1949 |
| 2,530,546 | Snyder | Nov. 21, 1950 |
| 2,640,024 | Palmateer | May 26, 1953 |
| 2,679,824 | Schmuldt | June 1, 1954 |
| 2,721,535 | Zitkus | Oct. 25, 1955 |
| 2,776,640 | Miklofsky et al. | Jan. 8, 1957 |
| 2,800,448 | Fredenburgh | July 23, 1957 |
| 2,872,894 | Isreeli | Feb. 10, 1959 |